United States Patent [19]

Hiramatsu et al.

[11] Patent Number: 4,777,506
[45] Date of Patent: Oct. 11, 1988

[54] CAMERA HAVING AN ASSEMBLING ADJUSTING DEVICE

[75] Inventors: Akira Hiramatsu; Akira Ishizaki, both of Yokohama; Keiji Ohtaka, Tokyo; Akira Akashi; Yasuo Suda, both of Yokohama, all of Japan

[73] Assignee: Canon Kabushiki Kaisha, Tokyo, Japan

[21] Appl. No.: 77,998

[22] Filed: Jul. 27, 1987

Related U.S. Application Data

[63] Continuation of Ser. No. 740,492, Jun. 3, 1985, abandoned.

[30] Foreign Application Priority Data

Jun. 9, 1984 [JP] Japan .................. 59-118827
Jun. 13, 1984 [JP] Japan .................. 59-121135
Jun. 13, 1984 [JP] Japan .................. 59-121136

[51] Int. Cl.$^4$ .............................................. G03B 3/00
[52] U.S. Cl. ...................................... 354/408; 250/201
[58] Field of Search ............... 354/402, 406–408, 354/479, 152, 154; 250/578, 239, 201 PF, 204

[56] References Cited

U.S. PATENT DOCUMENTS

| 4,391,513 | 7/1983 | Fujiki .................. 354/407 X |
| 4,470,682 | 9/1984 | Suzuki et al. .......... 354/406 |
| 4,498,754 | 2/1985 | Ohno et al. ............ 354/479 |
| 4,526,458 | 7/1985 | Kawamura et al. ....... 354/406 |
| 4,555,169 | 11/1985 | Suda et al. ........... 354/407 |

Primary Examiner—W. B. Perkey
Attorney, Agent, or Firm—Fitzpatrick, Cella, Harper & Scinto

[57] ABSTRACT

A camera having an assembling adjusting device comprises a casing for a camera body, a photo-sensor disposed in the casing to receive an object image, a relay optical system for relaying a light beam from the object, a holder arranged in the casing to hold the relay optical system, a photo-sensor array for producing a focus detection signal in response to a focusing light from the relay optical system, a package for accommodating the photo-sensor array, a coupler for coupling the package to the holder, and compensation means for adjusting an attitude of the package to the holder to compensate for an inclination of the photo-sensor array plane to the focusing light.

13 Claims, 5 Drawing Sheets

CAMERA HAVING AN ASSEMBLING ADJUSTING DEVICE

This application is a continuation of application Ser. No. 740,492 filed June 3, 1985, now abandoned.

BACKGROUND OF THE INVENTION

1. Field of the Invention

The present invention relates to a one-eye reflex type camera having a solid-state imaging device used for a silver halide film, and more particularly to a one-eye reflex type camera having a structure which enables accurate and rapid adjustment of parts when a focus detection device is assembled in a camera body.

2. Description of the Prior Art

In a focus detection device of a camera which directs an object image applied through an imaging lens to a photo-electric conversion device through a focus detection optical system and detects an in-focus state of an object in accordance with an output signal of the photo-electric conversion device, a positional relation between a light emitted from the focus detection optical system and a plane of the photo-electric conversion device must be accurate. In the past, component parts are grouped into units to reduce the number of units which are to be adjusted for mutual positions and those units are positionally adjusted. However, since such adjustment is done under care of fine positional adjustment and there are mutual interferences in two-dimensional adjustment, a number of steps are required before a final adjustment is attained.

SUMMARY OF THE INVENTION

It is an object of the present invention to allow easy adjustment in assembling a focus detection device.

It is another object of the present invention to provide a structure which eliminates an inclination of a plane of a photo-electric conversion device to an incident light, which leads to a reducing detection precision.

It is other object of the present invention to eliminate an offset of an optical axis of an optical system which refocus an object image from an optical axis of an object lens.

It is a further object of the present invention to prevent an undesired light from being applied to a photo-electric conversion device without increasing dead space.

DETAILED DESCRIPTION OF THE PREFERRED EMBODIMENTS

Figure 1:
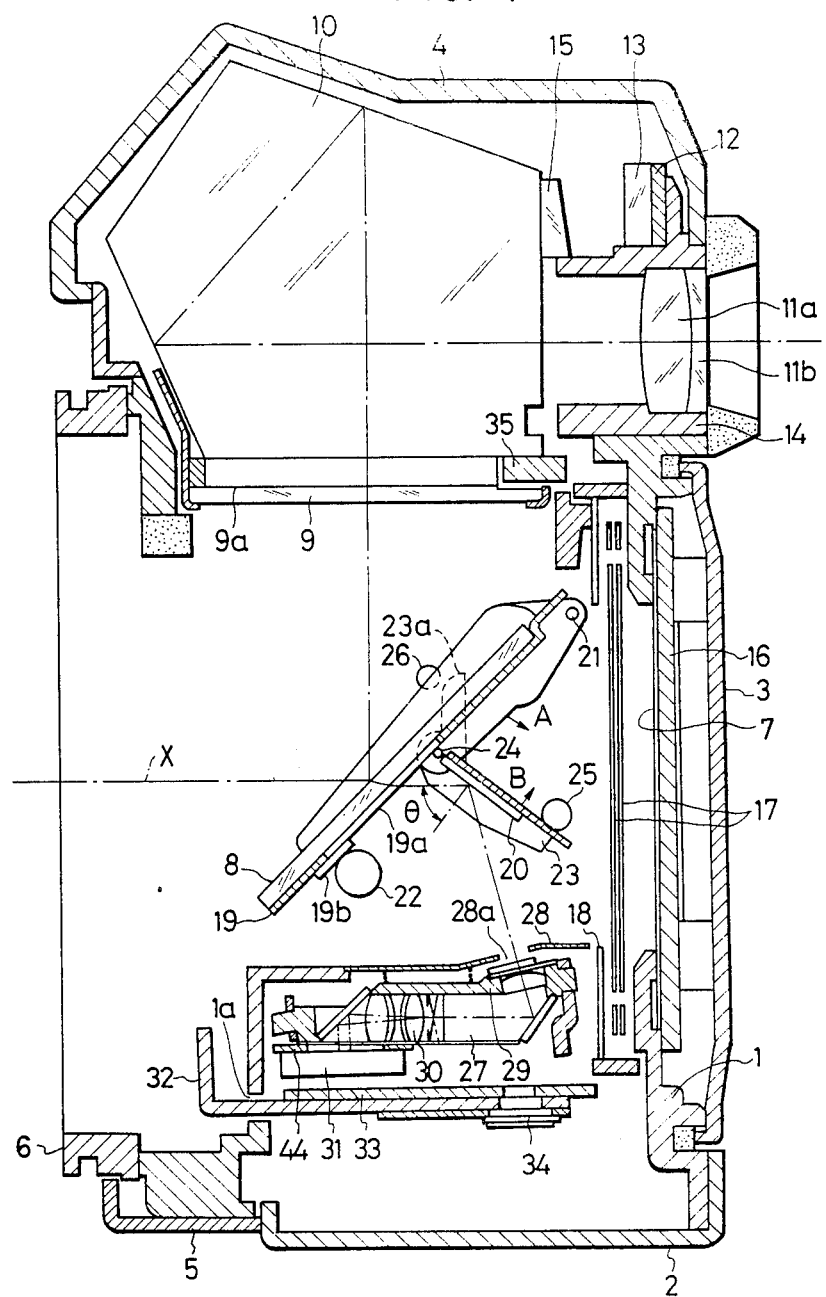
FIG. 1 is a sectional view of a camera in accordance with one embodiment of the present invention.

FIG. 1 is a sectional view of a camera with a main mirror in a descended position. A camera body may comprise a die cast base 1, a bottom cover 2, a rear cover 3, a top cover 4, a front cover 5 and a lens mount 6 on which an imaging lens L is mounted. A main mirror 8 which selectively directs a light beam transmitted through the imaging lens L to a finder optical system or a photograph film plane 7 is arranged in a center mirror box. A center area of the main mirror 8 is a half-mirror.

A pint glass 9, a penta prism 10 and eye lenses 11a and 11b are sequentially arranged along an optical axis of the finder optical system. A photo-sensor 12 for measuring a brightness of an object which is used for exposure and a flenel lens 13 for condensing a light diffused by a mat plane 9a of the pint glass 9 to the photo-sensor 12 are fixed to a top of an eye lens frame 14, and a prism 15 for setting a peak of a distance measurement sensitivity to a center of an imaging plane is mounted to an exit plane of the penta prism 10 to face the flenel lens 13.

A pressing plate 16 for holding the photograph film in a focal plane, a shutter curtain 17 of a focal plane shutter and an aperture frame 18 are arranged along a direction extending inwardly from the rear cover 3.

The main mirror 8 at the center of the mirror box is attached to a main mirror hold frame 19 which has an opening 19a at a center thereof through which the light transmitted through the half-mirror is directed to a sub-mirror 20. The hold frame 19 is rotatably supported by a shaft 21 and biased by a spring (not shown) to be rotated in a direction A. The rotation is restricted within a predetermined range by a stopper 22 slightly projecting into a side of the mirror box. A rubber plate 19b for absorbing shock is attached at a position of the hold frame 19 to which a stopper 22 abuts. The sub-mirror 20 for directing the light beam transmitted through the half-mirror to the focus detection optical system is arranged behind the main mirror hold frame 19 so that an incident angle θ of the light passing through the optical axis of the imaging lens is larger than 45 degrees. The sub-mirror 20 is fixed to a sub-mirror hold frame 23 which is rotatably supported by a shaft 24 to the main mirror hold frame 19 and biased by a spring (not shown) to be rotated in a direction B. A stopper 25 defines a stop position of the sub-mirror hold frame 23. A cam 23a is formed at an end of the sub-mirror hold frame 23 facing the shaft 24 and the cam 23a follows an outer circumference of a guide pin 26 as the main mirror 8 lifts.

A sensor unit 28 which is a secondary focusing optical system for focus detection is arranged below the main mirror 8 through a first mask 28 which serves to prevent ghost. A light incident area of the first mask 28 is an opening 28a having a center axis along the light path. The sensor unit 27 comprises a unit holder 29, a secondary focusing lens 30 and a sensor package 31 having a CCD line sensor, attached to the bottom of the unit holder 29. An actuation lever 32 which is linked to an automatic stop lever on the imaging lens and a plate 33 for holding the lever 32 are arranged below the sensor unit 27 and the actuation lever is pivotably supported by a calking dowel 34. An in-focus state indication LED 35 is mounted on the bottom of the penta prism 10.

Figure 2:
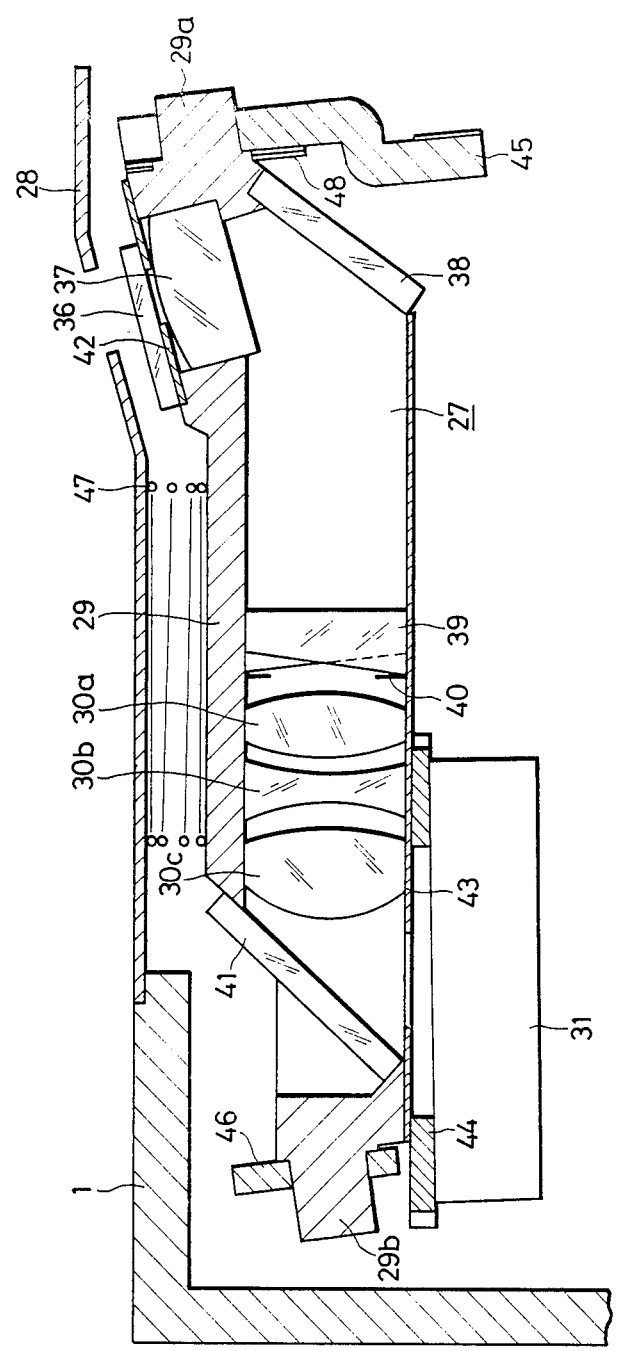
FIG. 2 is a sectional view of a sensor unit.

FIG. 2 shows a sectional view of the sensor unit 27 and an adjustment mechanism therefor. An infrared ray cut-off filter 36, a field lens 37, a reflection mirror 38, an image separation prism 39, a stop 40, secondary focusing lenses 30a, 30b and 30c and a second reflection mirror 41 are sequentially arranged along an incident light path. The image separation prism 39 and the secondary focusing lenses 30a, 30b and 30c are molded. A second mask 42 is arranged in front of the field lens 37 and it is located in a primary focal plane. A third mask 43 for preventing a stray light and an inclination adjusting plate 44 are mounted between the unit holder 29 and the sensor package 31. The unit holder 29 has integrally and coaxially formed shafts 29a and 29b at the opposite ends thereof. The shaft 29a is rotatably supported by an adjusting plate 45 and the shaft 29b is rotatably held by an adjusting arm 46. The sensor unit 27 is biased downward by a coil spring 47. By adjusting a positional relationship of a rotatable adjusting plate 48 mounted on the unit holder 29 and the adjusting plate 45, the light path in the sensor unit 27 by the shafts 29a and 29b is adjusted.

In the mechanisms shown in FIGS. 1 and 2, in the descended position of the main mirror 8 shown in FIG. 1, the light beam transmitted through the imaging lens is split to a light beam which is directed to the finder optical system by the main mirror 8 and a light beam which is directed to the focus detection optical system. The light beam transmitted through the half-mirror at the center of the main mirror 8 is reflected by the sub-mirror 20 and directed to the focus detection optical system located at the bottom of the mirror box. The focus detection optical system is in the sensor unit 27 shown in FIG. 2 and the light beam passes through the first mask 28, infrared ray cut-off filter 26, second mask 42, field lens 37, first reflection mirror 38, image separation prism 39, stop 40, secondary focusing lenses 30a, 30b, 30c, second reflection mirror 41, third mask 43, inclination adjusting plate 44 and sensor package 31. A phase difference of images on the two lines of CCD line sensors of the sensor package 31 is detected to detect the in-focus state of the imaging lens.

Since an incident angle of the light passing through the optical axis X of the imaging lens to the sub-mirror 20 is larger than 45 degrees and the first ghost prevention mask 28 for preventing the light reflected by the surface of the field lens 37 from entering into the photograph film is provided, the opening of the focus detection optical system can be positioned closely to the aperture frame 18 at the bottom of the mirror box so that the focus detection optical system can be arranged in an effective manner.

As the main mirror hold frame 19 is lifted against the biasing force of the direction A shown in FIG. 1 as the shutter release is moved, the guide pin 26 slides on the cam 23a of the sub-mirror hold frame 23, and as the main mirror hold frame 19 is further lifted, the sub-mirror hold frame 23 is rotated oppositely to the direction B shown in FIG. 1. When the lifting of the main mirror hold frame 19 is completed, the sub-mirror hold frame 23 is folded and the imaging light beam reaches the shutter curtain 17 without being blocked. The sub-mirror hold frame 23 blocks the opening 19a of the main mirror hold frame 19 to prevent the light from reverse-entering into the mirror box from the finder optical system.

Figure 3:
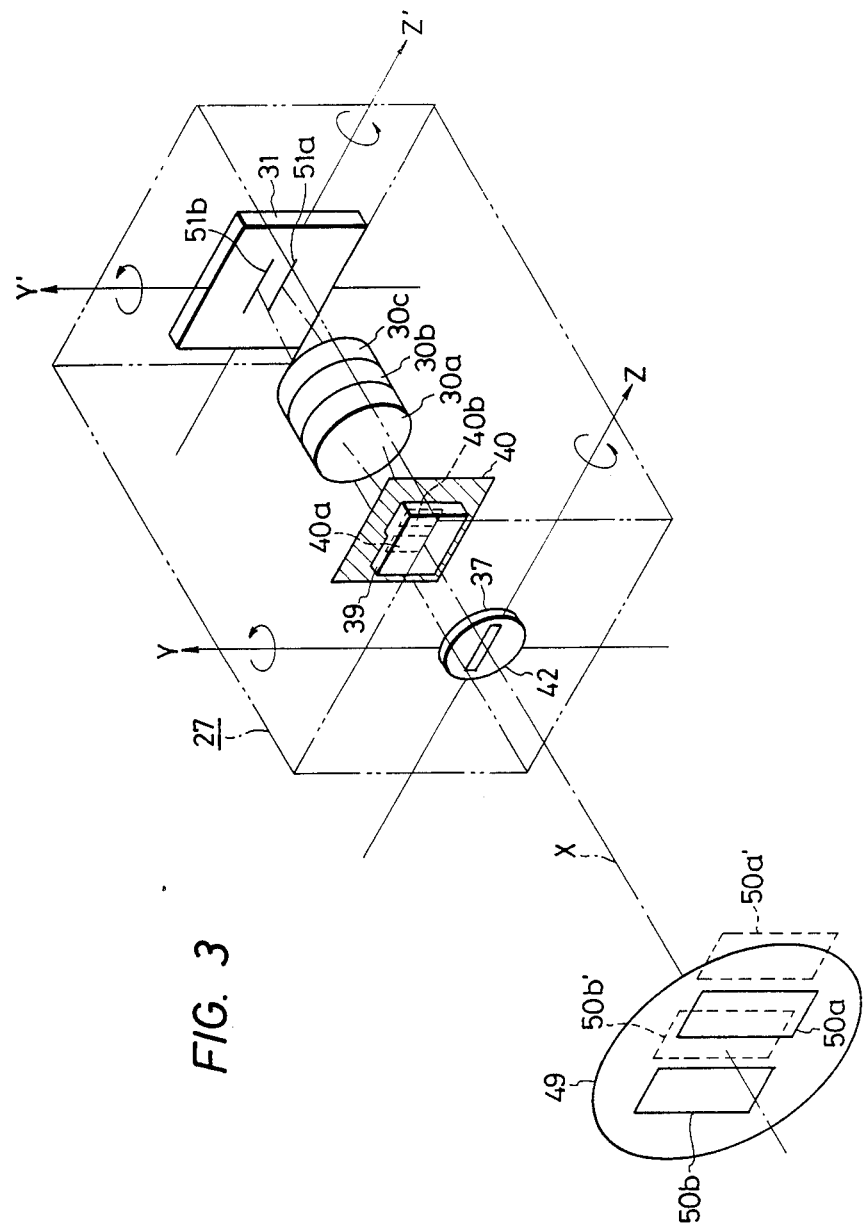
FIG. 3 is a sectional view of a focus detection optical system.

FIG. 3 illustrates the operation of the auto-focusing optical system. It is different from the actual arrangement. The stop 40 of the secondary focusing system is arranged behind the image separation prism 39 and two rectangular openings 40a and 40b are formed on the opposite sides of the optical axis. Images 50a and 50b of the openings 40a and 40b when the stop 40 is projected by the field lens 37 are formed on an exit pupil 49 of the imaging lens. Images 50a' and 50b' which are formed by a positional deviation of the stop 40 or excentricity or inclination between the optical axis of the imaging lens and the optical axis of the focus detection optical system are also shown. The light beam transmitted through the opening 40a of the stop forms the secondary image on the CCD line sensor 51a, and the light beam transmitted through the opening 40b of the stop forms the secondary image on the CCD line sensor 51b. The in-focus state is detected by detecting the phase difference between the output signals of the CCD line sensors 51a and 51b.

Since the light beams directed to the stop openings 40a and 40b pass through the areas of the images 50a and 50b or 50a' and 50b' of the stop openings 50a and 50b, respectively, if the area is beyond the exit pupil 49 as is the image 50a', the illumination strength on the corresponding CCD line sensor 51a or 51b is low and the measurement of distance is not attained or includes an error. Accordingly, the projection position of the incident pupil of the secondary focusing optical system onto the imaging lens exit pupil 49 must be precise and the adjustment mechanism is essential because of limitation to the precision in machining the parts. Specifically, a first adjusting mechanism for rotating the sensor unit 27 around Y-axis the and Z-axis which are normal to the optical axis X, shown in FIG. 3. If the secondary focusing lenses 30a, 30b and 30c are eccentric or the CCD line sensors 51a and 51b are not precisely positioned to the sensor package 31, the in-focus points deviate at the opposite ends of a view field. In order to compensate for it, a second adjusting mechanism for rotating the CCD line sensors 51a and 51b around a Y'-axis passing through a vicinity of the sensor package 31 is used. A principle thereof is shown in FIG. 4.

Figure 4:
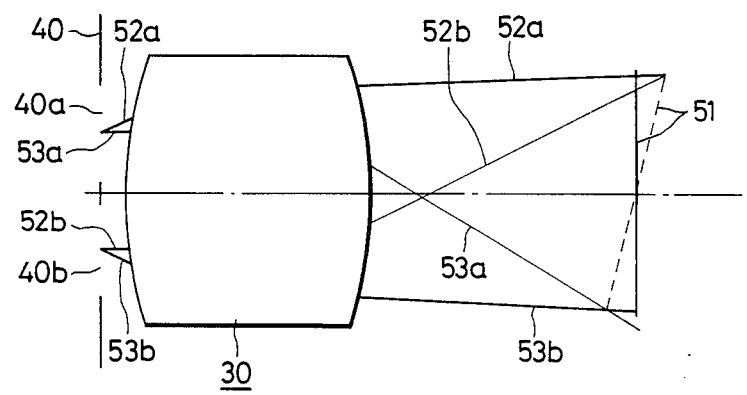
FIG. 4 illustrates sensor inclination adjustment.
Figure 6:
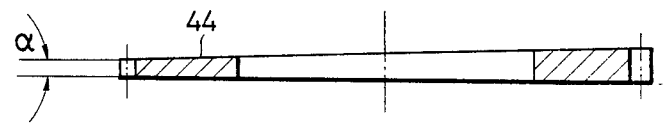
FIG. 6 is a sectional view of an inclination adjustment plate.

FIG. 4 is a conceptual view of the secondary focusing optical system shown in FIG. 3. Numerals 52a and 52b denote lights which are emanated from the stop openings 40a and 40b and directed to one end of the CCD line sensor 51, and numerals 53a and 53b denotes lights which are directed to the other end. If the secondary focusing lenses 30 are eccentric, the lights 52a and 52b may intersect behind an intersecting point of the lights 53a and 53b. In this case, if the CCD line sensor 51 is located at a solid line position, the in-focus points at the opposite ends of the view field deviate and the exact distance measurement is not attained. By rotating the CCD line sensor 51 to a broken line position, the light 52a and 52b and the lights 53a and 53b both intersect on the sensor 51 and the in-focus point deviation is prevented.

Figure 5:
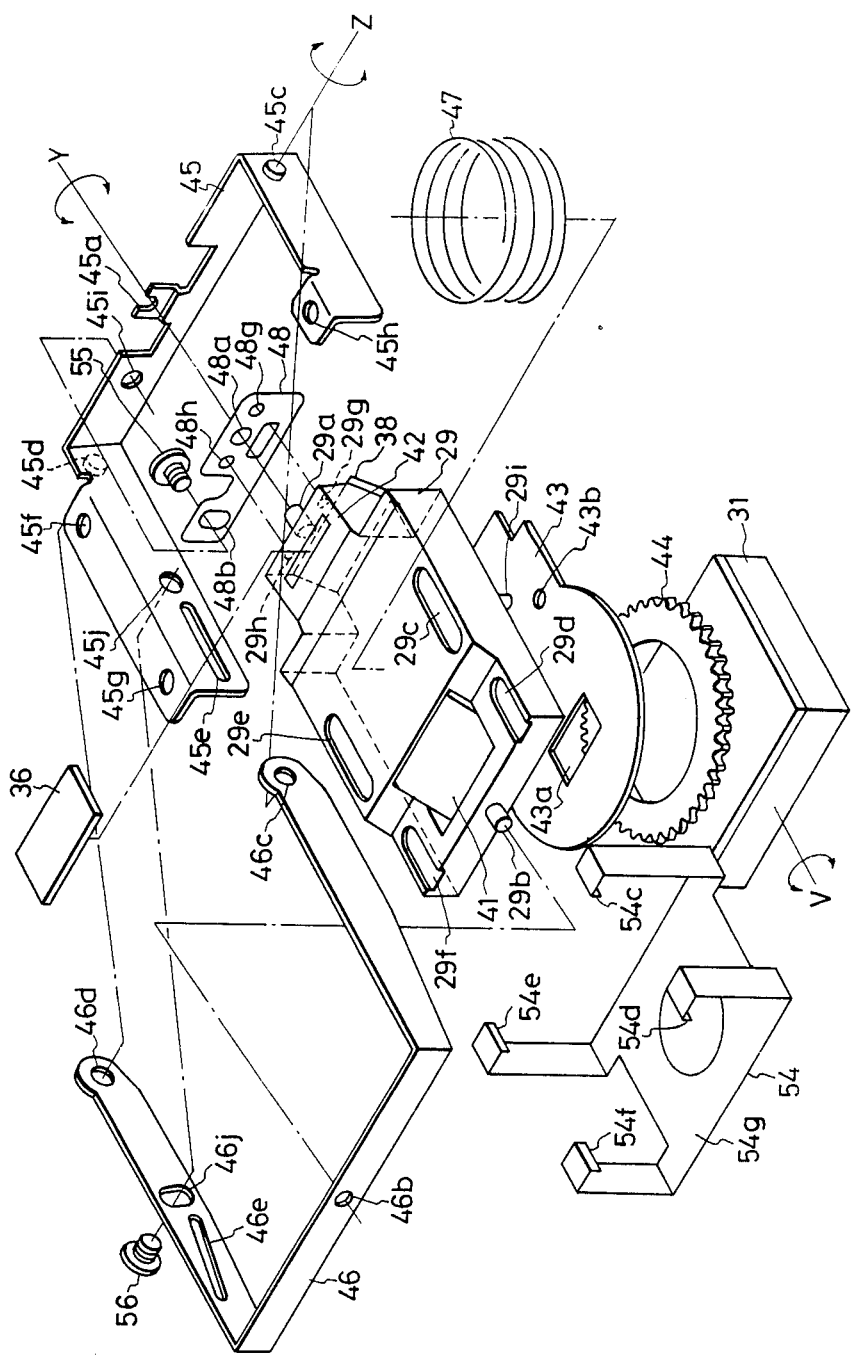
FIG. 5 is an exploded perspective view of an adjusting mechanism.

FIG. 5 shows a developed perspective view of an adjusting mechanism of the sensor unit 27. The sensor package 31 for accommodating the CCD line sensor 50a and 50b, the inclination adjusting plate 44 and the third mask 43 are secured to the unit holder 29 by the inner surface 54g of the sensor fixing spring 54. Pawls 54c, 54d, 54e and 54f of the sensor fixing spring 54 engage with recesses 29c, 29d, 29e and 29f of the unit holder 29 so that they are positively secured. The inclination adjusting plate 44 has a sectional shape having non-parallel plane with an angle α and has teeth formed on an outer periphery thereof. The sensor package 31 is urged by the sensor fixing spring 54 to allow rotation around the Y'-axis shown in FIG. 3 as the inclination adjusting plate 44 is rotated. It is also rotated around the Z'-axis but the affect to the focus detection precision is negligible because the spacing between the CCD line sensors 51a and 51b is usually less than one quarter of the length of the sensor. The third mask 43 has an opening 43a and an effective light beam passes therethrough and is directed to the sensor. As shown in FIG. 2, the third mask 43 covers the entire bottom surface of the unit holder 29 to block stray light from the actuation lever opening 1a shown in FIG. 1.

The rotation adjusting plate 48 inserted to the shaft 29a of the unit holder 29 is fixed to the unit holder 29 by fitting the calking dowels 29g and 29h of the unit holder 29 into the calking holes 48g and 48h and heat-calking them. The rotation adjusting plate 48 is made of a resilient metal plate and has a locking loose hole 48b and a hole 48a for the shaft 29a formed therein. The bearing 45a of the adjusting plate 45 is rotatably fitted to the shaft 29a of the unit holder 29 which extends through the holes 48a of the rotation adjusting plate 48, the shaft 29b of the unit holder 29 is rotatably fitted to the hole 46b of the adjusting arm 46, and the dowels 45c and 45d of the adjusting plate 45 are fitted to the holes 46c and 46d of the adjusting arm 46 so that they are coupled to the sensor unit 27. After the coil spring 47 has been attached to the top of the unit holder 29, it is coupled to the base 1 of the camera by the bolt holes 45g, 45f and 45h of the adjusting plate 45 so that the sensor unit 27 is urged downward.

The attitude of the sensor unit 27 is required for the rotation around the Y-axis shown in FIG. 3, that is, the rotation of the unit holder 29 around the shafts 29a and 29b in FIG. 5, and the rotation around the Z-axis, that is, the rotation of the adjusting arm 46 around the holes 46c and 46d in FIG. 5. The adjustment of the rotation around the Y-axis is effected by rotating the rotation adjusting plate 48, and after the adjusting of the rotation, it is fixed by inserting the bolt 55 into the locking loose hole 48b of the rotation adjusting plate 48. The adjustment of the rotation around the Z-axis is effected by inserting a zig into an oblique slot 46e of the adjusting arm 46 and a slot 45e of the adjusting plate 45 and moving it in the direction of the slit. After the adjustment, a bolt 56 is inserted into a locking slot 46i of the adjusting arm 46 and a locking bolt hole 45j of the adjusting plate 45. Since the coil spring 47 is in a charged position and the sensor unit 27 is always urged downward, there is no play of the shaft 29a. Since the rotation adjusting plate 48 is made of the resilient metal plate, the adjustment of the rotation around the Y-axis and the adjustment of the rotation around the Z-axis can be effected independently without interference.

What is claimed is:

1. A focus detection apparatus for detecting a focus adjusting state of an objective lens comprising:
    optical means for receiving light passing through the objective lens to form a plurality of light patterns corresponding to an image of an object;
    sensing means having a plurality of photosensors for sensing said light patterns to generate a signal corresponding to the focus adjusting state of the objective lens, said sensing means including a photosensing plane;
    holding means for holding said optical means; and
    inclination means for inclining the photosensing plane of said sensing means with respect to said holding means to change the incident angle of the light flux from said optical means into said photosensing plane.

2. Apparatus according to claim 1, further comprising light distribution means for distributing a light beam corresponding to said object image to observation means and said optical means.

3. Apparatus according to claim 1, wherein said optical means forms a plurality of light patterns having parallax with respect to said image formed by said objective lens.

4. Apparatus system according to claim 1, wherein said inclination means is a plate having non-parallel, opposite sides.

5. Apparatus according to claim 4, wherein said plate is circular and has teeth formed on a periphery thereof.

6. Apparatus system according to claim 1, further comprising a casing, wherein said holding means comprises a holder arranged in said casing for holding said optical means, wherein said apparatus further comprises a package for accommodating said sensing means, and coupling means for coupling said package to said holder, said coupling means being a spring for urging said package to said holder.

7. Apparatus according to claim 1, further comprising compensation means for compensating for a bias of said optical means to an optical axis of said objective lens.

8. Apparatus according to claim 7, wherein said compensation means tilts said optical means independently around orthogonal axes normal to a direction of the optical axis of said objective lens entering said optical means.

9. Apparatus according to claim 8, wherein said axes normal to a direction of the optical axis of said objective lens are located adjacent to an anticipated focal plane of said optical means.

10. Apparatus according to claim 1, said holding means comprising a holder for holding said optical means and blocking undesirable light directed to said optical means and said sensing means.

11. Apparatus according to claim 10, wherein said holder has an aperture for restricting light impinging on said sensing means.

12. A camera body having an apparatus for detecting a focus adjusting state of an objective lens, comprising:
    a finder;
    photo-sensing means for sensing an image formed by an objective lens;
    a multiple-image forming optical system for relaying the image formed by said objective lens and forming a plurality of images having parallax;
    light distribution means for distributing the image formed by said objective lens to said finder, said photo-sensing means and said multiple-image forming optical system;
    photo-electric conversion means having a number of photo-sensors for detecting the multiple images;
    tilt means for tilting said multiple-image forming optical system around an axis normal to a predetermined optical axis of said objective lens through said light distribution means; and
    inclination means for inclining an incident plane of said photo-electric conversion means with respect to a light path of said multiple-image forming optical system.

13. A camera body according to claim 12, wherein said tilt means tilts multiple-image forming optical system independently around orthogonal axes normal to a direction of the optical axis of said objective lens entering said multiple-image forming optical system.

* * * * *

UNITED STATES PATENT AND TRADEMARK OFFICE
CERTIFICATE OF CORRECTION

PATENT NO. : 4,777,506

DATED : October 11, 1988

INVENTOR(S) : Hiramatsu, et al.

It is certified that error appears in the above-identified patent and that said Letters Patent is hereby corrected as shown below:

COLUMN 1

Line 40, "a" should be deleted.

COLUMN 2

Line 10, "flenel lens 13" should read --fresnel lens 13--; and

Line 15, "flenel lens 13." should read --fresnel lens 13.--.

COLUMN 4

Line 23, "y-axis and z-axis" should read --the y-axis and the z-axis--;

Line 37, "denotes" should read --denote--;

Line 49, "a developed" should read --an exploded--; and

Line 58, "having" should read --having a--.

UNITED STATES PATENT AND TRADEMARK OFFICE
CERTIFICATE OF CORRECTION

PATENT NO. : 4,777,506

DATED : October 11, 1988

INVENTOR(S) : Hiramatsu, et al.

It is certified that error appears in the above-identified patent and that said Letters Patent is hereby corrected as shown below:

COLUMN 6

Line 62, "tilts multiple-image" should read

--tilts said multiple-image--.

Signed and Sealed this

First Day of August, 1989

Attest:

DONALD J. QUIGG

Attesting Officer

Commissioner of Patents and Trademarks